United States Patent
Ni et al.

(10) Patent No.: US 12,505,404 B2
(45) Date of Patent: Dec. 23, 2025

(54) DIVIDE-AND-CONQUER FRAMEWORK AND MODULARIZED ALGORITHMIC SCHEME FOR LARGE-SCALE OPTIMIZATION

(71) Applicant: Walmart Apollo, LLC, Bentonville, AR (US)

(72) Inventors: Ming Ni, Pflugerville, TX (US); Kunlei Lian, Bentonville, AR (US); Yu Zheng, Bentonville, AR (US); Liqing Zhang, Humble, TX (US); Ti Zhang, Rocklin, CA (US); Jing Huang, San Jose, CA (US); Mingang Fu, Palo Alto, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/103,131

(22) Filed: Jan. 30, 2023

(65) Prior Publication Data

US 2024/0257034 A1 Aug. 1, 2024

(51) Int. Cl.
*G06Q 10/0834* (2023.01)
*G06Q 10/047* (2023.01)
*G06Q 10/087* (2023.01)

(52) U.S. Cl.
CPC ....... *G06Q 10/0834* (2013.01); *G06Q 10/047* (2013.01); *G06Q 10/087* (2013.01)

(58) Field of Classification Search
None
See application file for complete search history.

(56) References Cited

U.S. PATENT DOCUMENTS

| 6,292,822 | B1 | 9/2001 | Hardwick |
| 6,934,931 | B2* | 8/2005 | Plumer ................ G06Q 10/00 700/28 |
| 8,195,496 | B2 | 6/2012 | Gottlieb et al. |
| 8,266,601 | B2* | 9/2012 | Stojanovic ............... G06F 8/51 717/136 |

(Continued)

OTHER PUBLICATIONS

"Machine Learning speeds up vehicle routing: Strategy accelerates the best algorithmic solvers for large sets of cities," by Becky Ham, Dec. 10, 2021 (Year: 2021).*

(Continued)

*Primary Examiner* — Jeff Zimmerman
*Assistant Examiner* — Brian Adams Heflin
(74) *Attorney, Agent, or Firm* — FOLEY & LARDNER LLP

(57) ABSTRACT

A method including obtaining an optimization request at a coordinating engine. The method also can include triggering engines to process the optimization request. At least one of the engines divides the optimization request into subproblems. At least a portion of the engines solve the subproblems. Respective instances of at least one of the engines are triggered to handle respective ones of the subproblems. Each of the engines provides a dynamic algorithmic flow using modularized algorithmic solvers. The dynamic algorithmic flow is adjusted based on a respective input to each of the engines. The method additionally can include outputting, from the coordinating engine, one or more results in response to the optimization request, based on results for the subproblems generated by the engines. Other embodiments are described.

20 Claims, 10 Drawing Sheets

(56) References Cited

U.S. PATENT DOCUMENTS

| | | | |
|---|---|---|---|
| 11,132,422 B2* | 9/2021 | Chen | G06N 5/01 |
| 2006/0224423 A1* | 10/2006 | Sun | G06Q 10/04 |
| | | | 705/7.26 |
| 2007/0005551 A1* | 1/2007 | Winkler | G06Q 10/047 |
| 2008/0244584 A1* | 10/2008 | Smith | G06F 9/4881 |
| | | | 718/102 |
| 2009/0254405 A1* | 10/2009 | Hollis | G06Q 10/06315 |
| | | | 705/7.25 |
| 2010/0131444 A1* | 5/2010 | Gottlieb | G06Q 10/063 |
| | | | 706/46 |
| 2016/0048802 A1* | 2/2016 | Luwang | G06Q 10/08355 |
| | | | 705/338 |
| 2016/0379168 A1 | 12/2016 | Foerster et al. | |
| 2021/0302175 A1* | 9/2021 | Pishdadian | G01C 21/3626 |
| 2024/0183670 A1* | 6/2024 | Ushijima-Mwesigwa | |
| | | | G01C 21/3446 |

OTHER PUBLICATIONS

"A Scalable Modular Convex Solver for Regularized Risk Minimization," Choon Hui Teo, Quoc Le, Alex Smola, and S.V.N. Vishwanathan, Aug. 12-15, 2007 (Year: 2007).*

"Optimization in multimodal freight transportation problems: A Survey," by Claudia Archetti, Lorenzo Peirano, M. Grazia Speranza, May 16, 2022, vol. 299, Issue 1, pp. 1-20 (Year: 2022).*

"Plug-and-Play Dual-Tree Algorithm Runtime Analysis," by Ryan R. Curtin, Dongryeol Lee, William B. March, and Parikshit Ram, Dec. 2015 (Year: 2015).*

\* cited by examiner

DIVIDE-AND-CONQUER FRAMEWORK AND MODULARIZED ALGORITHMIC SCHEME FOR LARGE-SCALE OPTIMIZATION

TECHNICAL FIELD

This disclosure relates generally to a divide-and-conquer framework and modularized algorithmic scheme for large-scale optimization.

BACKGROUND

Optimization problems arise in many contexts. For example, minimizing overall cost while ensuring on-time deliveries in a transportation network according to various service expectations is an optimization problem. Many optimization problems are NP-hard (non-deterministic polynomial-time hard), so as the problem size grows, solving such optimization problems become increasingly challenging.

BRIEF DESCRIPTION OF THE DRAWINGS

To facilitate further description of the embodiments, the following drawings are provided in which.

Figure 1:
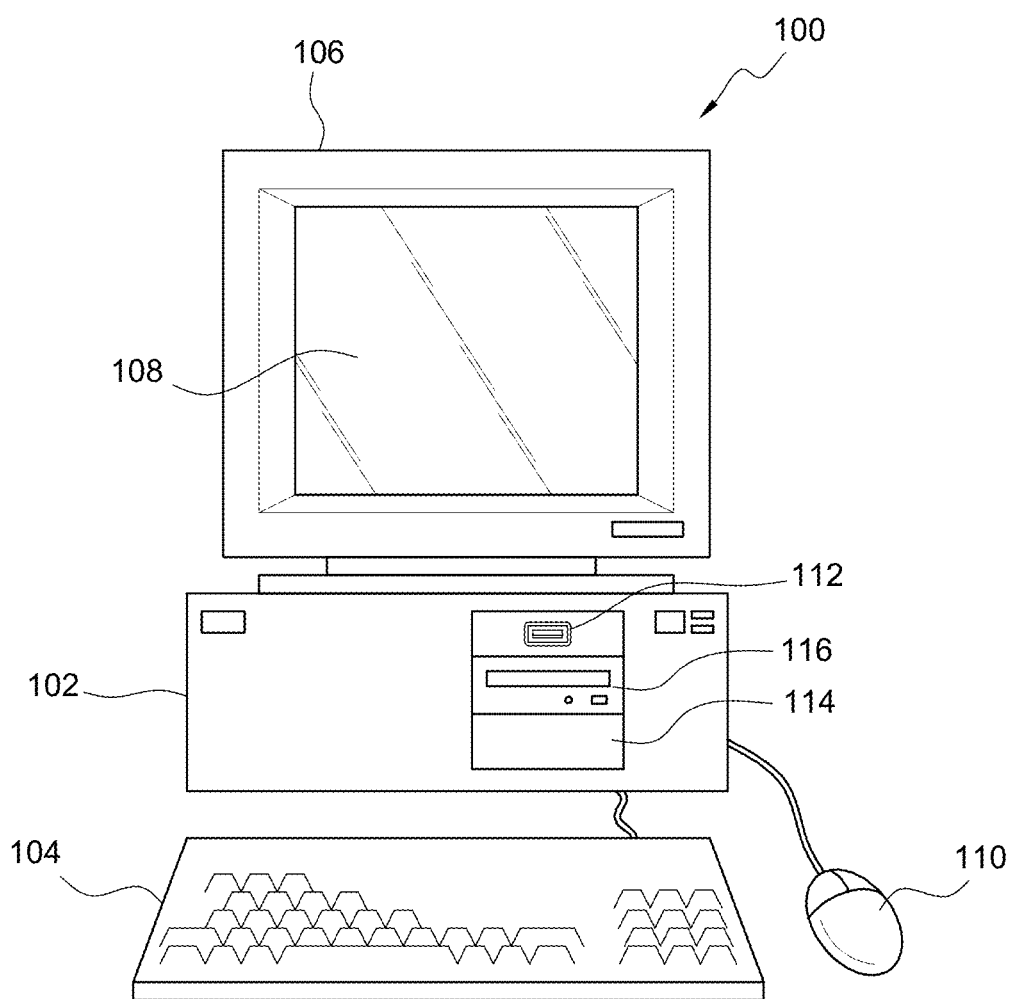
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
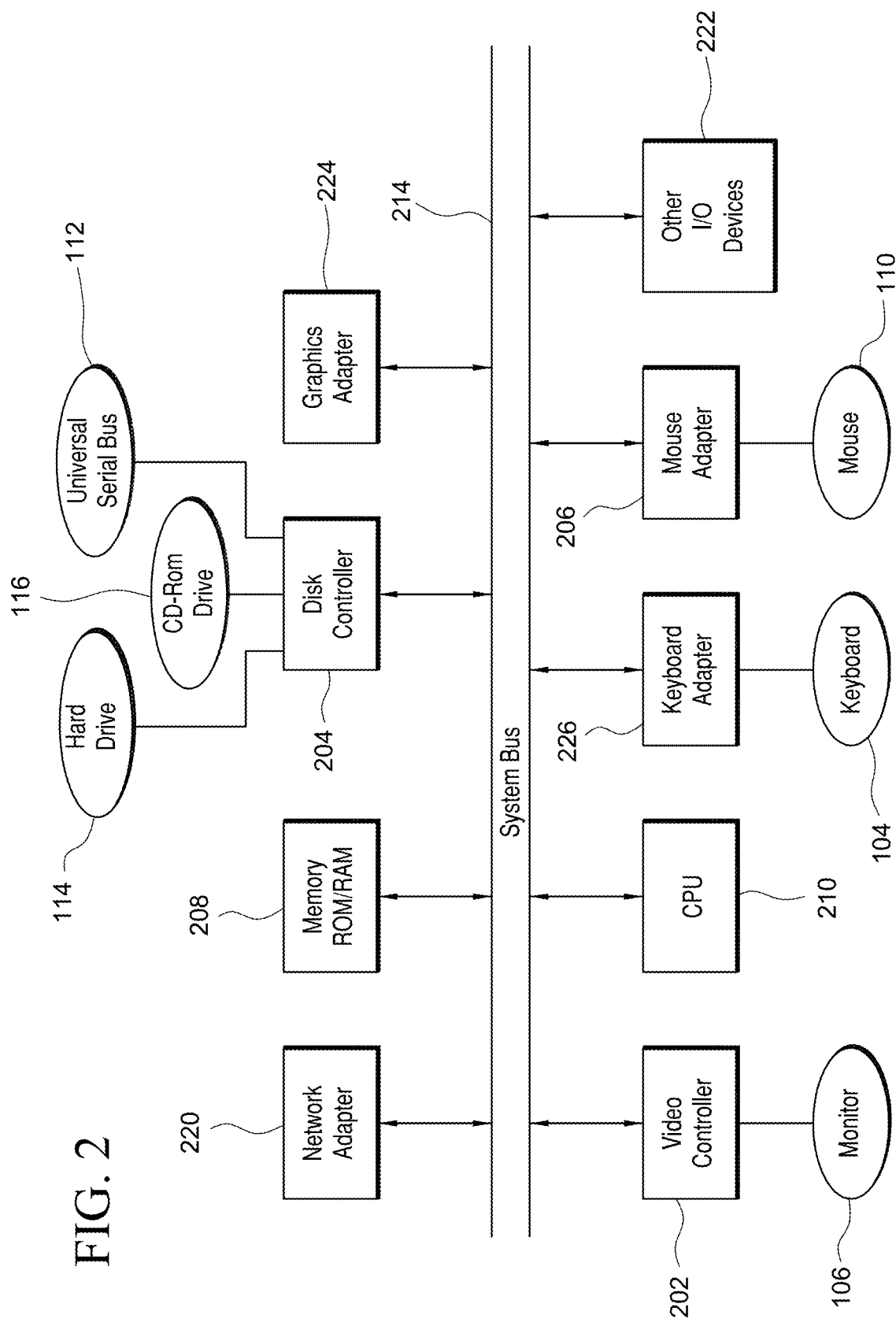
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
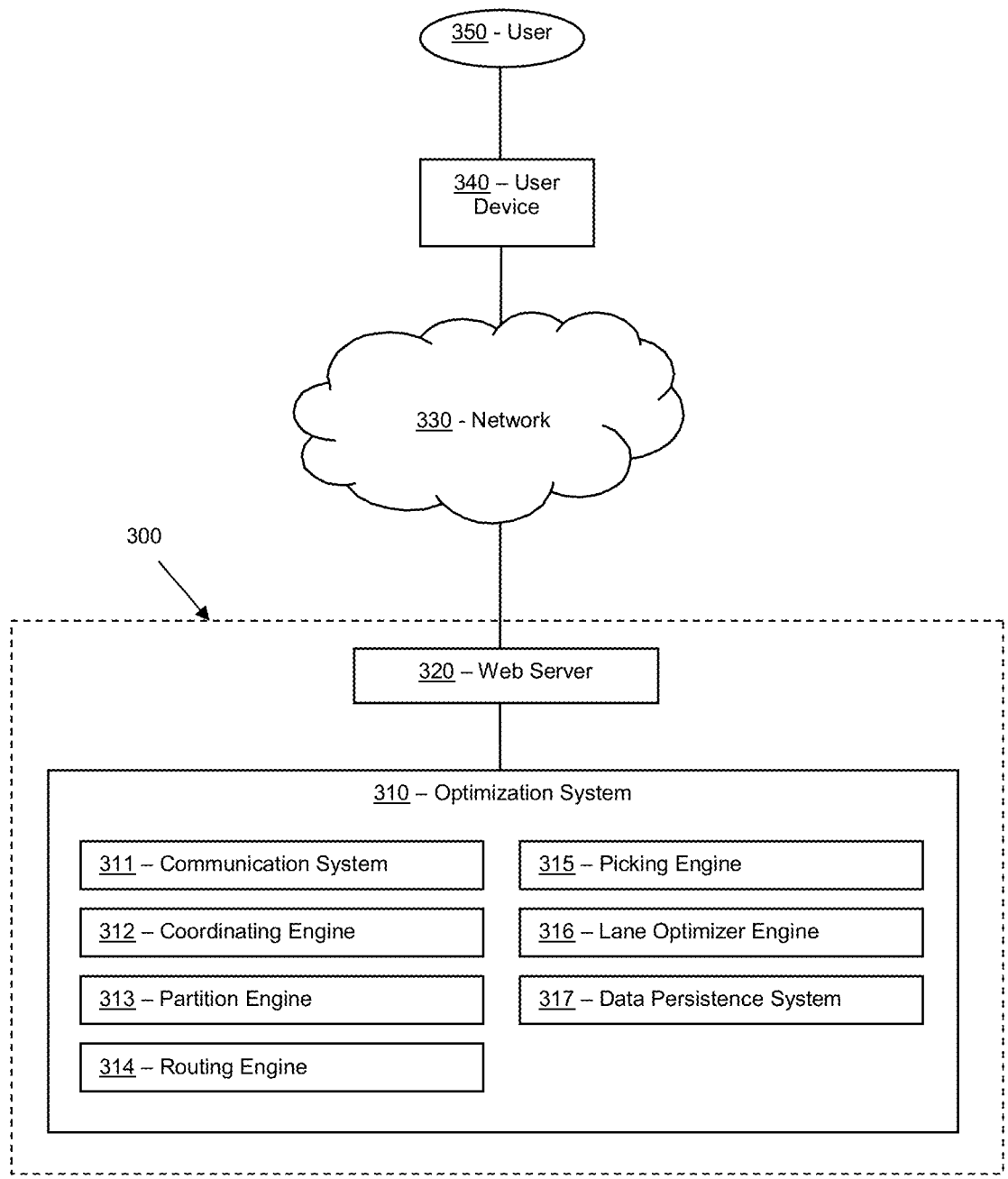
FIG. 3 illustrates a block diagram of a system that can be employed for a modularized algorithmic scheme for multiphase optimization, according to an embodiment.

Turning ahead in the drawings, FIG. 3 illustrates a block diagram of a system 300 that can be employed for a modularized algorithmic scheme for multiphase optimization, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an optimization system 310 and/or a web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Optimization system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host optimization system 310 and/or web server 320. Additional details regarding optimization system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interface with optimization, such as to generate transportation schedules for a large-scale freight transportation network.

In some embodiments, an internal network that is not open to the public can be used for communications between optimization system 310 and web server 320 within system 300. Accordingly, in some embodiments, optimization system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Lumia® or similar product by the Nokia Corporation of Keilaniemi, Espoo, Finland, and/or (iii) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Android™ operating system developed by the Open Handset Alliance, or (iii) the Windows Mobile™ operating system by Microsoft Corp. of Redmond, Washington, United States of America.

In many embodiments, optimization system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to optimization system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of optimization system 310 and/or web server 320. In a similar manner, the processors and/or the non-transitory computer-readable media can be local and/or remote to each other.

Meanwhile, in many embodiments, optimization system 310 and/or web server 320 also can be configured to communicate with one or more databases, such as a data persistence system 317. The one or more databases can store inputs, constraints, data structure, and/or outputs used in processing optimization problems, and/or other suitable information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, optimization system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, optimization system 310 can include a communication system 311, a coordinating engine 312, a partition engine 313, a routing engine 314, a picking engine 315, a lane optimizer engine 316, and/or data persistence system 317. In many embodiments, the systems and/or engines of optimization system 310 can be modules of computing instructions (e.g., software modules) stored at non-transitory computer readable media that operate on one or more processors. In other embodiments, the systems of optimization system 310 can be implemented in hardware. Optimization system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host optimization system 310 and/or web server 320. Additional details regarding optimization system 310 and the components thereof are described herein.

Figure 4:
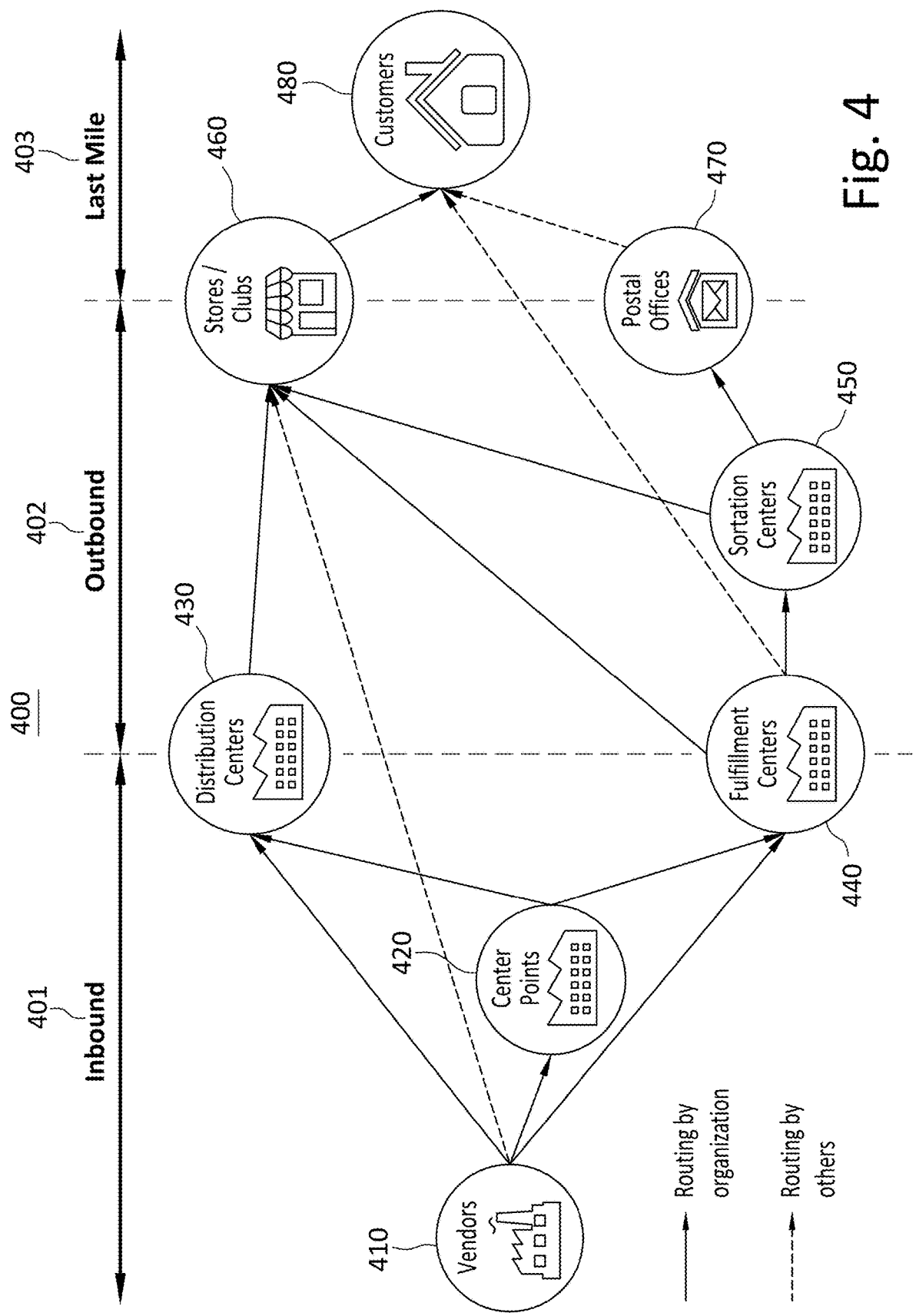
FIG. 4 illustrates facilities and transport responsibility involved in distributing items from vendors to customers that involve an organization (e.g., a retailer)

Turning ahead in the drawings, FIG. 4 illustrates facilities 400 and transport responsibility involved in distributing items from vendors 410 to customers 480 that involve an organization (e.g., a retailer). Vendors can transport items to center points 420 of the organization, distribution centers 430 of the organization, fulfillments centers 440 of the organization, and/or stores 460 of the organization. In many embodiments, the transport from vendors 410 to center points 420, distribution centers 430, and fulfillments centers 440 can be handled by the organization. In many embodiments, the transport from vendors 410 to stores 460 can be by others. Center points 420 can be facilities that have inbound and outbound docks for receiving and sending items without significant storage of the items. Distribution centers 430 can store items and send them to stores 460, such as when requested by stores 460. Fulfillment centers 440 can be similar to distribution centers 430, but can handle online orders with or without also shipping to stores 460. Fulfillments centers 440 can send products to customers 480 through postal offices 470, typically proceeding first through sortation centers 450 of the organization to sort the items for handling by postal offices 470.

Transport from vendors 410 to distribution centers 430 and/or fulfillments centers 440, whether or not through center points 420, is inbound transport, and these facilities and the shipments between them are an inbound network 401. Transport from distribution centers 430 and/or fulfillments centers 440 to stores 460 and/or postal offices, whether or not through sortation centers 450, is called outbound transport, and these facilities and the shipments between them are an outbound network 402. Transport from stores 460 and/or postal offices 470 to customers 480 is called last mile, and these facilities and the shipments between them are a last mile network 403. For example, deliveries handled by the organization from stores 460 to customers 480 are called last mile deliveries.

Figure 5:
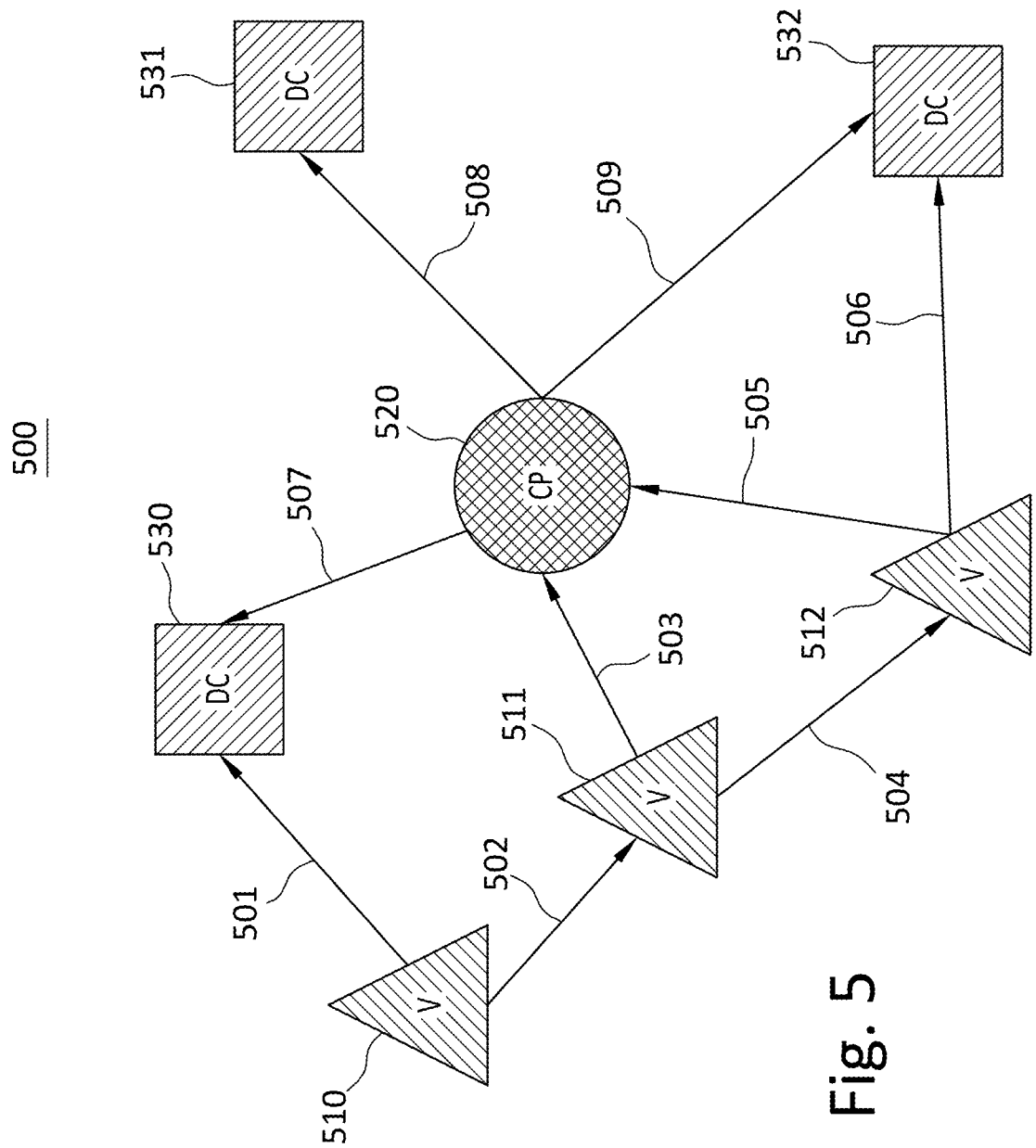
FIG. 5 illustrates an exemplary inbound network, including vendors, a center point, and distribution centers.

Turning ahead in the drawings, FIG. 5 illustrates an exemplary inbound network 500, including vendors 510-512, a center point 520, and distribution centers 530-532. Vendors 510-512 can be examples of vendors 410 (FIG. 4). Center point 520 can be an example of center point 420 (FIG. 4). Distribution centers 530-532 can be examples of distribution centers 430 (FIG. 4). Various different types of loads can be transported in this inbound network 500. First, single-pickup direct loads can used, such as a load from vendor 510 to distribution center 530 along a leg 501. The load is direct because it does not go through a center point (e.g., 520). The load is single-pickup, as it involves a single vendor (e.g., 510). Second, multi-pickup direct loads can be used, such as a load from vendor 511 to vendor 512 along a leg 504, and then to distribution center 532 along a leg 506. The load is multi-pickup, as it involves multiple vendors (e.g., 511, 512). Third, single-pickup consolidation loads can be used, such as a load from vendor 512 to center point 520 along a leg 505, and then from vendor 512 to distribution centers 530 and 531 along legs 507 and 508, respectively. The load is consolidation because it uses a center point. Fourth, multi-pickup consolidation loads can be used, such as a load from vendor 510 to vendor 511 along a leg 502, then from vendor 511 to center point 520 along a leg 503, and then to distribution centers 531 and 532 along legs 508 and 509, respectively. Various available transportation modes can be available for legs, such as truck, rail, postal carrier, etc. Various different lanes can be available for each mode. Various different carriers can be available for each lane.

In many embodiments, an optimization problem can be used to determine the flow of goods in an inbound network (e.g., 500) from vendors to distribution centers, combining and optimizing shipments into loads to meet service expectations while minimizing the total transportation cost. Inputs to this optimization problem can include the relevant transportation network facilities (e.g., the vendors, distribution centers, and the center points involved), the shipments (e.g., freights of goods to be moved from the vendors to the distribution centers), carrier information (e.g., applicable equipment, transit times, charge rates, weekly commitment and historical usage, time flexibility allowance, etc.), and/or other suitable inputs. Various constraints can be involved in the optimization problem, such as time feasibility (e.g., shipment pickup and/or delivery windows, facility open hours, etc.), facility capacity, equipment capacity, loading method (e.g., pallet, case), and/or other suitable constraints. Outputs to the optimization problem can be the load (e.g., shipment direct or consolidation, transportation mode, lane, carrier, etc.), the plan of events to move the load from the vendors to the distribution centers, and/or other suitable outputs.

Although inbound network 500 is relatively small, inbound networks can be large, which can make solving the optimization problems challenging. For example, the inbound network for an organization can have more than 2,500 vendors, more than 100 distribution centers, more than 10 center points, more than 30,000 shipments per day, and more than 40 alternative carrier and mode choices for each leg of the network. Good consolidation quality can increase truck utilization rate, which can lead to lower overall transportation cost. Optimization system 310 (FIG. 3) can be used by a freight planner system to solve optimization problems for a transportation network or various portions thereof (such as general merchandise, dry grocery, etc.). In many embodiments, optimization system can be scalable to solve the optimization problems with different sizes of inputs. In many embodiments, a divide-and-conquer technique can be used to solve the optimization problem within various service level constraints (e.g., timing requirements) when handling various different sizes of input.

Figure 6:
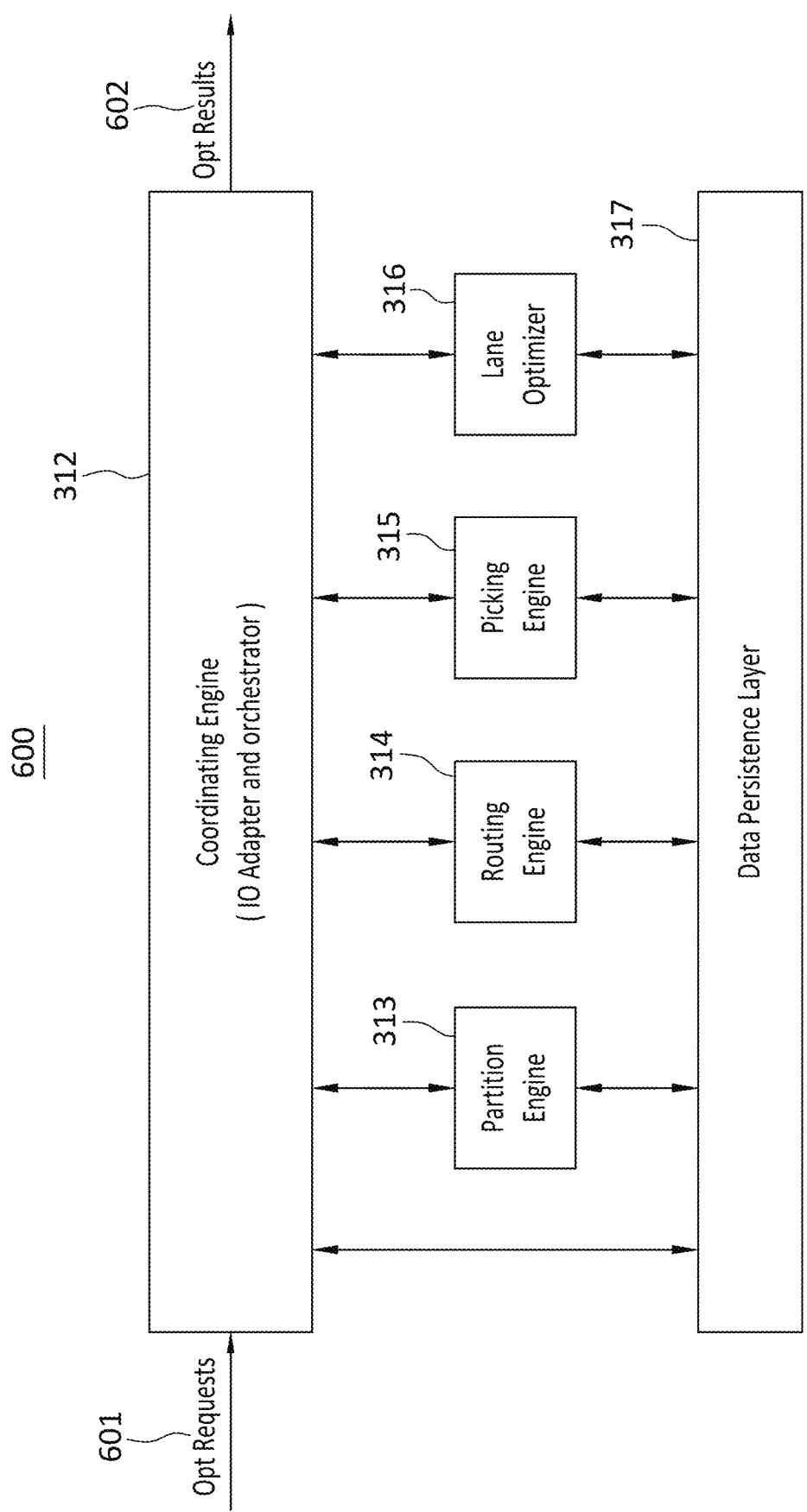
FIG. 6 illustrates a block diagram of an architecture of the engines and the data persistence system of the optimization system of FIG. 3.
Figure 7:
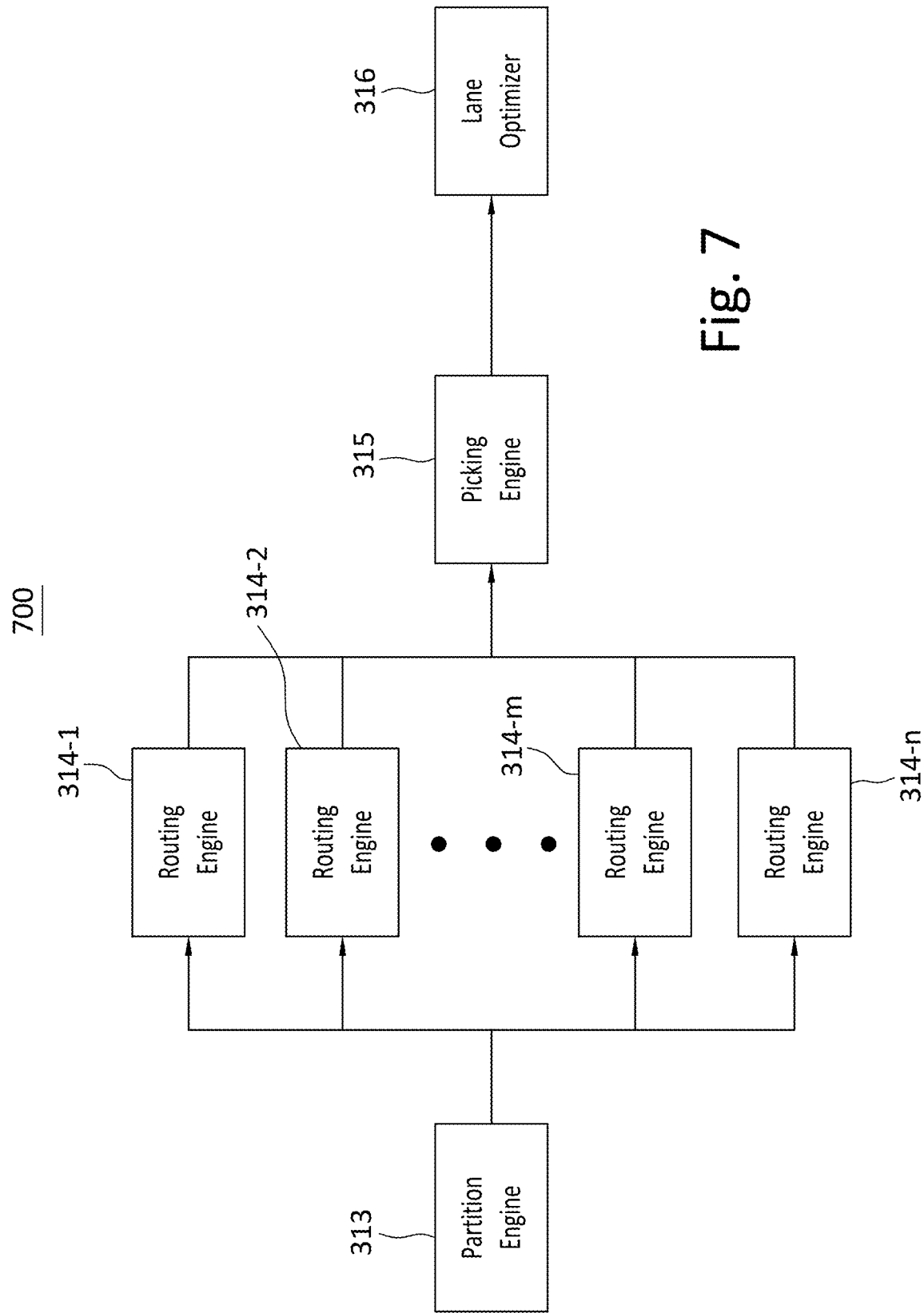
FIG. 7 illustrates a flow chart of a data flow of data among some of the engines of the optimization system of FIG. 3.

Turning ahead in the drawings, FIG. 6 illustrates a block diagram of an architecture 600 of engines 312-316 and data persistence system 317 within optimization system 310 (FIG. 3). Turning ahead in the drawings, FIG. 7 illustrates a flow chart of a data flow 700 of data among engines 313-316 within optimization system 310 (FIG. 3). Architecture 600 is merely exemplary, and embodiments of optimization system 310 (FIG. 3) are not limited to architecture 600 presented herein. Data flow 700 is merely exemplary, and the data flow within optimization system 310 (FIG. 3) is not limited to data flow 700 presented herein.

As shown in FIGS. 6-7, a divide-and-conquer framework can be used that breaks down the algorithm processing the optimization problem into various different functional engines (e.g., engines 313-316). A central coordinating engine, such as coordinating engine 312, can be an input/output (IO) adapter and orchestrator among the functional engines (e.g., engines 313-316), so that the functional engines can be triggered to process subproblems of the optimization problem. Each functional engine can be triggered a single time or multiple times, and/or can run multiple instances in parallel to solve respective subproblems of the optimization problem directly. In several embodiments, engines 312-316 can interface with data persistence system 317 to access and/or store data. In many embodiments, the data in data flow 700 can be stored in data persistence system 317 between engines. In many embodiments, architecture 600 can make use of cloud computing a parallel processing.

In several embodiments, coordinating engine 312 can receive inputs (e.g., optimization requests 601), output optimization results 602 (e.g., outputs), and/or orchestrate the overall optimization process. In a number of embodiments, coordinating engine 312 can keep track of engine status, such as ready, busy, complete, or failed, of the engines. In other embodiments, communication system 311 (FIG. 1) can be used for IO with optimization system 310 (FIG. 3).

In several embodiments, partition engine 313 can divide the inbound network (e.g., 500 (FIG. 5)) into several smaller subnetworks to be solved independently by routing engine 314. In many embodiments, the partitioning scheme used by partition engine 313 can be data driven.

In several embodiments, routing engine 314 can generate candidate loads, such as feasible loads and/or loads that meet a threshold level of quality for the subnetworks. For example, shipments can be consolidated as candidate loads. In many embodiments, coordinating engine 312 can trigger multiple instances of routing engine 314, and each instance of routing engine 314 can solve a different subnetwork, as generated by partition engine 313. The number of instances of routing engine 314 can be scaled on-demand to the number of subnetworks. For example, as shown in FIG. 7, routing engine can involve instances 314-1, 314-2, . . . , 314-$m$, and 314-$n$, where n is the number of instances of the routing engine triggered, and m=n−1. These instances of the routing engine can be implemented by distributed process, such as parallel processing across parallel processors.

In several embodiments, picking engine 315 can select the final set of loads to be used from among the combined pool of candidate loads generated from the multiple instances of routing engine 314. For example, loads can be consolidated across the entire network, and loads can be selected to minimize overall transportation costs.

In several embodiments, lane optimizer engine 316 can evaluate alternative carriers applicable to each load selected by picking engine 315, and select the most suitable carrier based on business lane constraints for each load.

In many embodiments, data persistence system 317 can facilitate data sharing to limit data requests between engines and/or limit duplicated requests. In many embodiments, engines can be scaled horizontally for parallel computing, as needed, including across the different types of engines. In many embodiments, the status of an engine can be saved, and the status can be rehydrated, such as copying the same steps from the previous run, such that rerunning of steps can be limited to fails, changes, or updates.

In many embodiments, architecture 600 can solve large-scale optimization problems, and can support solving such optimization problems on the largest transportation networks in the world. In many embodiments, architecture can be implemented with cloud computing, which can leverage automated cloud deployment solutions, such as Kubernetes (which was originally authored by Google, and is now provided by the Cloud Native Computing Foundation), to scale demand. The cloud infrastructure can be utilized to accelerate problem solving in the form of parallel computing.

Many conventional freight planning systems struggle to scale. For example, in some conventional systems, load templates are created, and shipments are assigned to the load templates. The load template creation often limits the possible choices. As another example, in some conventional systems, a strategy is generated to sequence different consolidation behaviors, and shipments are filtered with pre-configured characteristics for each consolidation behavior, which is then collected and compared, which involves extensive user involvement to monitor and handle new or changing scenarios and to add consolidation behavior accordingly to reflect the changed scenario. Both issues involve running steps sequentially, which limits its ability to be deployed in, and take advantage of, a parallel computing or distributed cloud environment.

In many embodiments, the techniques described herein can provide a modularized algorithm scheme to enable combination and reuse of algorithms, which also can be customized for different business units. For example, each of the functional engines (e.g., 313-316) of optimization system 310 can use a modularized algorithm scheme to combine and reuse algorithmic solvers. In many embodiments, the algorithmic solvers can be scaled vertically and/or horizontally.

Figure 8:
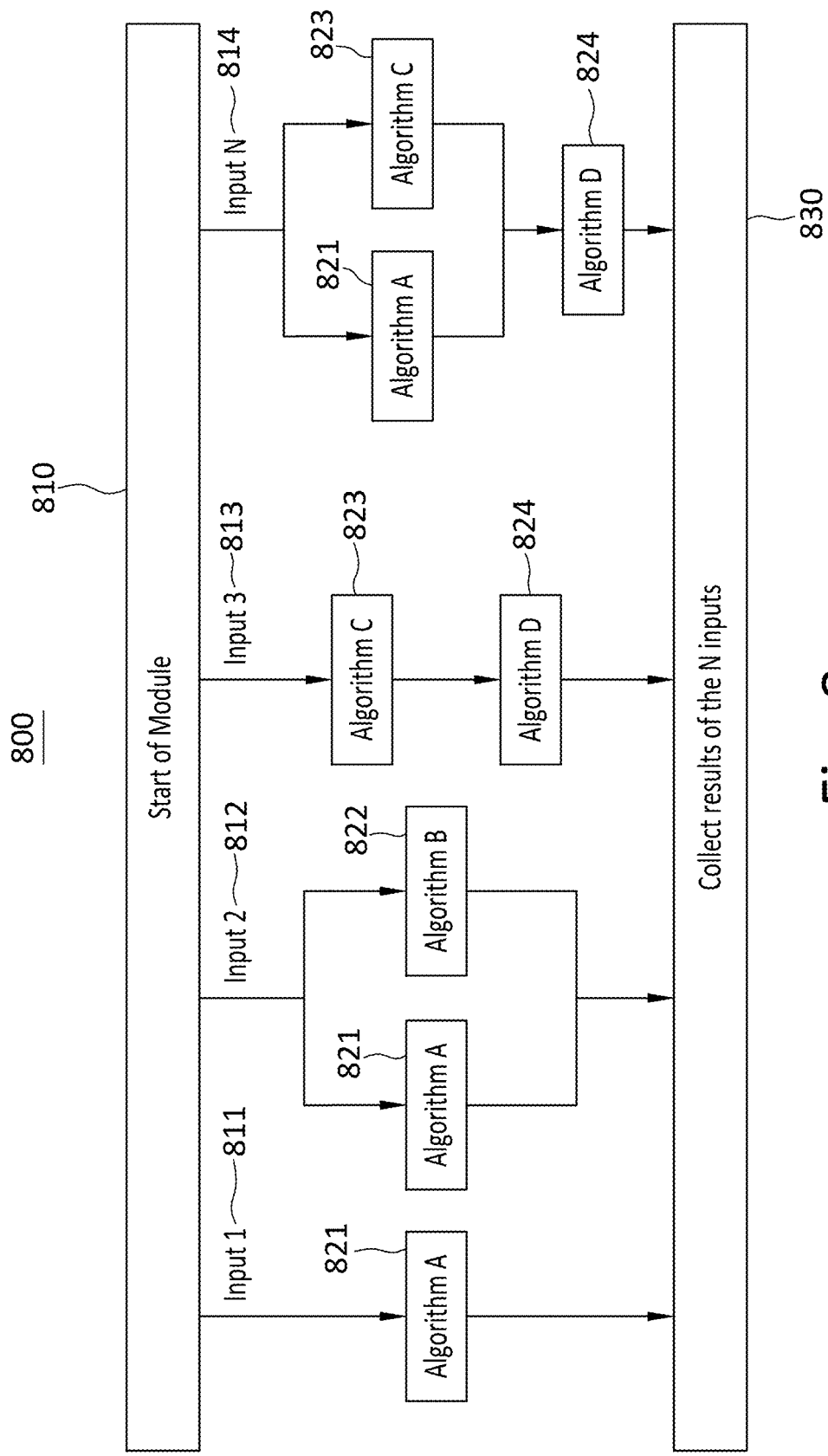
FIG. 8 illustrates a flow chart of an exemplary modularized algorithmic scheme.

Turning ahead in the drawings, FIG. 8 illustrates a flow chart of an exemplary modularized algorithmic scheme 800. Modularized algorithmic scheme 800 is merely exemplary, and the implementation of algorithmic solvers used within engines of optimization system 310 (FIG. 3) is not limited to modularized algorithmic scheme 800 presented herein. Modularized algorithmic scheme 800 can be implemented within one or more of the functional engines (e.g., 313-316 (FIGS. 3, 6-7)) of optimization system 310 (FIG. 3). In many embodiments, algorithms can be modularized as algorithmic solvers, such as algorithmic solvers 821-824, and modularized algorithmic scheme 800 can permute based on characteristics of the input to the functional engine (e.g., 313-316 (FIGS. 3, 6-7)), in order to solve the subproblem in various different ways, which can advantageously help to find better solutions.

As shown in FIG. 8, modularized algorithmic scheme 800 can begin with a start of module 810, which can involve determining inputs to use in various different series of algorithmic solvers. For example, the N different series of algorithmic solvers can be used. In a first series, an input 811 (Input 1) can be used, which can be input into algorithmic solver 821 (Algorithm A), and the output of algorithmic solver 821 can be sent to a collection process 830. In a second series, an input 812 (Input 2) can be used, which can be input in parallel into each of algorithmic solver 821 (Algorithm A) and algorithmic solver 822 (Algorithm B), and the output of both algorithmic solvers 821 and 822 can be sent to collection process 830. In a third series, an input 813 (Input 3) can be used, which can be input in series into algorithmic solver 823 (Algorithm C) after which the output of algorithmic solver 823 can be used as the input to algorithmic solver 824 (Algorithm D), and the output of algorithmic solver 824 can be sent to collection process 830. Other series can be used. In a Nth series, an input 814 (Input N) can be used, which can be input in parallel into each of algorithmic solver 821 (Algorithm A) and algorithmic solver 823 (Algorithm C), and the output of both algorithmic solvers 821 and 823 can be used as the input to algorithmic solver 824 (Algorithm D), after which the output of algorithmic solver 824 can be sent to collection process 830. Collection process 830 can collect the results from across the N series, which in many embodiments can be used to select the best result.

Figure 9:
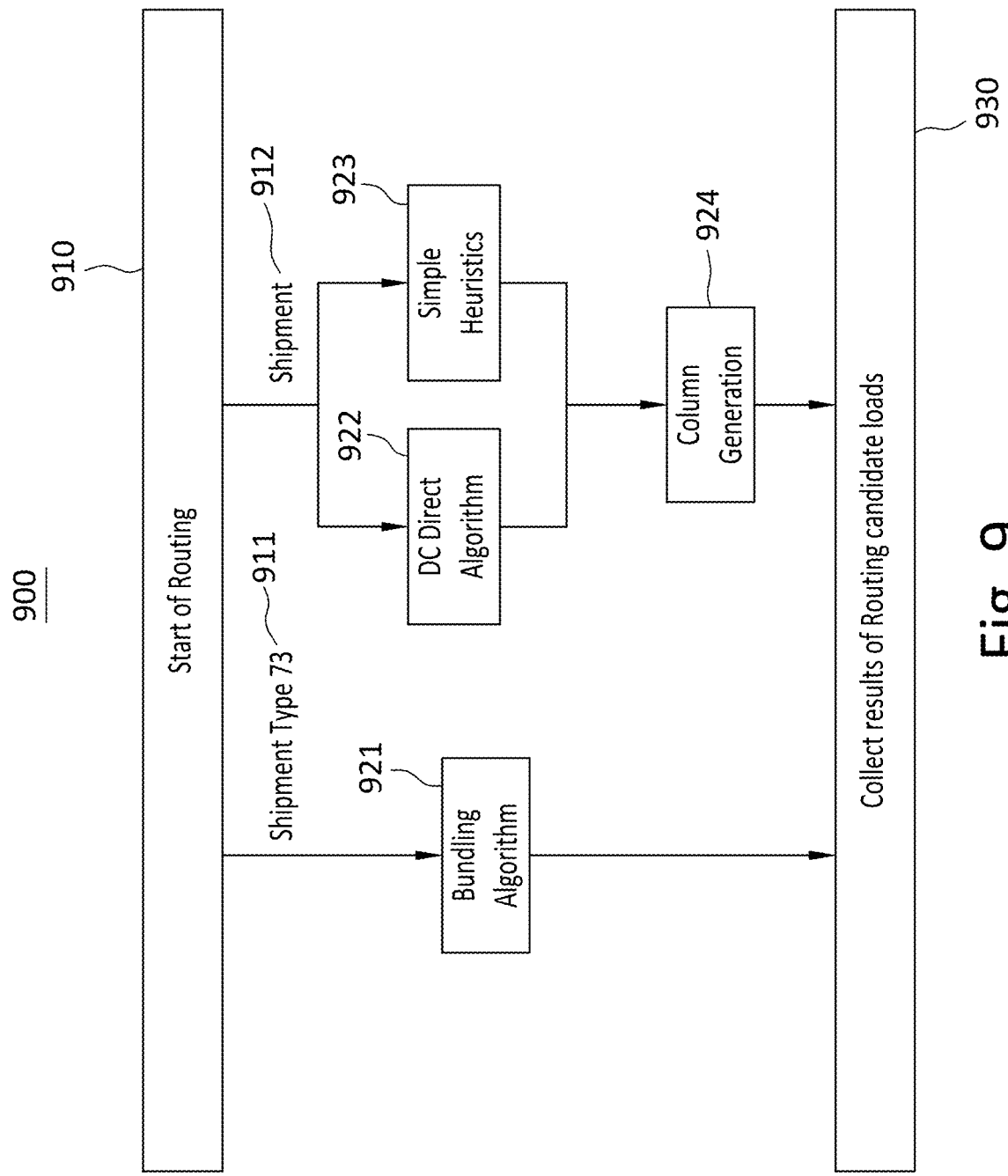
FIG. 9 illustrates a flow chart of another exemplary modularized algorithmic scheme, which can be implemented within the routing engine of FIG. 3.

Turning ahead in the drawings, FIG. 9 illustrates a flow chart of another exemplary modularized algorithmic scheme 900. Modularized algorithmic scheme 900 can be implemented within routing engine 314 (FIG. 3, 6-7). Modularized algorithmic scheme 900 is merely exemplary, and the implementation of algorithmic solvers used within routing engine 314 and/or other functional engines of optimization system 310 (FIG. 3) is not limited to modularized algorithmic scheme 900 presented herein. Modularized algorithmic scheme 900 can be similar to modularized algorithmic scheme 800 (FIG. 8).

As shown in FIG. 9, modularized algorithmic scheme 900 can begin with a start of routing 910, which can involve determining inputs to use in various different series of algorithmic solvers. For example, in this algorithmic scheme, the inputs can be shipment type 73, on the one hand, and another type of shipment, on the other hand. In other words, two shipment can be segregated based their type. In a first series, an input 911 (shipment details for a shipment type 73) can be used, which can be input into an algorithmic solver 921 (e.g., a bundling algorithm by spatiotemporal features or group identifier to consolidate as loads), and the output of algorithmic solver 921 can be sent to a collection process 930. In a second series, an input 912 (shipment details for the other shipment type) can be used, which can be input in parallel into each of an algorithmic solver 922 (e.g., a distribution center (DC) direct algorithm focused on constructing vendor to DC loads) and an algorithmic solver 923 (e.g., a simple heuristic algorithm focused on constructing loads by historical patterns), and the loads output from both algorithmic solvers 922 and 923 can be used as the input to an algorithmic solver 924 (e.g., a column generation algorithm), after which the output of algorithmic solver 924 can be sent to collection process 930. Collection process 930 can collect the results from the two series, which in many embodiments can be used to select the best result. In other embodiments, additional or other series can be used such as a series that uses a large neighborhood search algorithm, or another suitable algorithm.

In many embodiments, the algorithmic solvers (e.g., 821-824 (FIG. 8) and/or 921-924 (FIG. 9)) can use a uniform IO data structure, such that the algorithmic solvers can be used in a modular manner. In several embodiments, the algorithmic solvers can handle data import mechanisms from both computer memory and external storage, so that the modularized algorithm scheme can apply to one computing machine alone and/or to multiple computing machines in parallel. In a number of embodiments, an orchestration system can be used to generate dynamic algorithmic flows, which can be selected and/or changed according to the input. In many embodiments, additional algorithmic solvers can be added over time to gradually enrich the pool of algorithmic solvers to effectively handle various distinct characteristics of the input.

In many embodiments, the modularized algorithmic scheme can leverage mathematical recursion to create uniform IO to allow solving optimization problems and/or subproblems sequentially and/or concurrently. In a number of embodiments, the modularized algorithmic approach can provide a plug-and-play framework for newly developed algorithms to be added as new algorithmic solvers in modularized algorithmic schemes, which beneficially can allow the engines to keep improving. In many embodiments, the modularized algorithmic scheme can extend an ensemble method to mathematical optimization. In some embodiments, the modularized algorithmic scheme can provide the capability to be agile and scalable.

Figure 10:
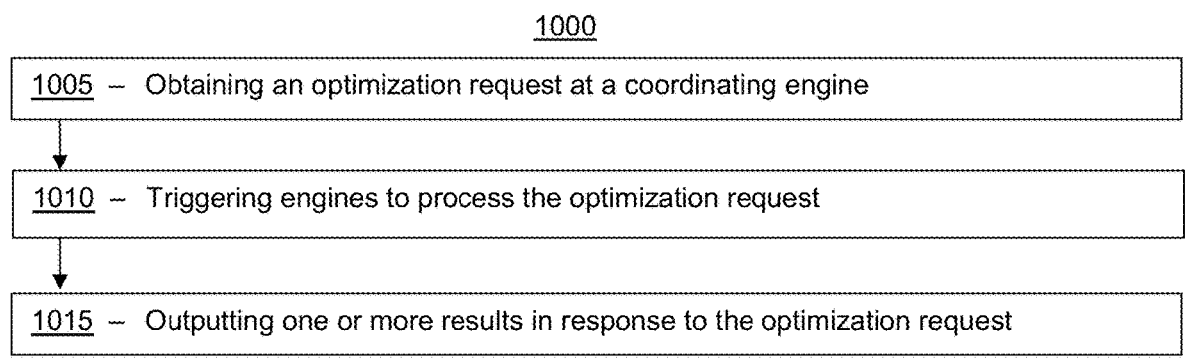
FIG. 10 illustrates a flow chart for a method of providing a modularized algorithmic scheme for multiphase optimization, according to an embodiment.

Turning ahead in the drawings, FIG. 10 illustrates a flow chart for a method 1000 of providing modularized algorithmic scheme for multiphase optimization, according to an embodiment. Method 1000 is merely exemplary, and is not limited to the embodiments presented herein. Method 1000 can be employed in many different embodiments or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped.

In many embodiments, system 300 (FIG. 3) and/or optimization system 310 (FIG. 3) can be suitable to perform method 1000 and/or one or more of the activities of method 1000. In these or other embodiments, one or more of the activities of method 1000 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 1000 and other activities in method 1000 can include using a distributed network including distributed memory architecture to perform the associated activity. This distributed architecture can reduce the impact on the network and system resources to reduce congestion in bottlenecks while still allowing data to be accessible from a central location.

Referring to FIG. 10, method 1000 can include an activity 1005 of obtaining an optimization request at a coordinating engine. The coordinating engine can be similar or identical to coordinating engine 312 (FIGS. 3, 6). The optimization request can be similar or identical to optimization requests 601 (FIG. 6). In some embodiments, the optimization request can be for an inbound transportation network. The inbound transportation network can be similar or identical to inbound network 401 (FIG. 4) and/or inbound network 500 (FIG. 5).

In a number of embodiments, method 1000 also can include an activity 1010 of triggering engines to process the optimization request. In some embodiments, at least one of the engines can divide the optimization request into subproblems, and/or at least a portion of the engines can solve the subproblems. In many embodiments, respective instances of at least one of the engines can be triggered to handle respective ones of the subproblems.

In some embodiments, the engines include a partition engine, a routing engine, a picking engine, and/or a lane optimizer engine. The partition engine can be similar or identical to partition engine 313 (FIGS. 3, 6-7). The routing engine can be similar or identical to routing engine 314 (FIGS. 3, 6-7). The picking engine can be similar or identical to picking engine 315 (FIGS. 3, 6-7). The lane optimizer engine can be similar or identical to lane optimizer engine 316 (FIGS. 3, 6-7).

In some embodiments, the partition engine can divide the inbound transportation network into subnetworks. In many embodiments, multiple instances of the routing engine can be triggered. In some embodiments, each instance of the multiple instances of the routing engine can be used for a different subnetwork of the subnetworks. In many embodiments, the picking engine can select a set of loads from a combined pool of candidate loads generated by the multiple instances of the routing engine. In some embodiments, the lane optimizer engine can select a carrier for each load of the set of loads.

In many embodiments, each of the engines can provide a dynamic algorithmic flow using modularized algorithmic solvers. The dynamic algorithmic flow can be similar or identical to modularized algorithmic scheme 800 (FIG. 8) and/or modularized algorithmic scheme 900 (FIG. 9). The modularized algorithmic solvers can be similar or identical to algorithmic solvers 821-824 (FIG. 8) and/or 921-924 (FIG. 9). In many embodiments, the dynamic algorithmic flow can be adjusted based on a respective input to each of the engines. In some embodiments, the dynamic algorithmic flow can be configurable to use recursion for one or more of the modularized algorithmic solvers.

In some embodiments, each of the engines can use a uniform IO data structure. In many embodiments, each of the engines can be configured to import data from computer memory and to import data from external storage. In some embodiments, at least a portion of the engines are processed in parallel using parallel processing.

In several embodiments, activity 1005 additionally can include an activity 1015 of outputting, from the coordinating engine, one or more results in response to the optimization request, based on results for the subproblems generated by the engines. The one or more results can be similar or identical to optimization results 602 (FIG. 6).

In many embodiments, the techniques described herein can provide a practical application and several technological improvements. In some embodiments, the techniques described herein can provide for modularized algorithmic scheme for multiphase optimization. The techniques described herein can provide a significant improvement over conventional approaches, as described above.

In a number of embodiments, the techniques described herein can solve a technical problem that arises only within the realm of computer networks, as processing engines and algorithmic solvers do not exist outside the realm of computer networks. Moreover, the techniques described herein can solve a technical problem that cannot be solved outside the context of computer networks. Specifically, the techniques described herein cannot be used outside the context of computer networks, in view of lack of processing engines and algorithmic solvers.

Various embodiments can include a system including one or more processors and one or more non-transitory computer-readable media storing computing instructions that, when executed on the one or more processors, cause the one or more processors to perform certain acts. The acts can include obtaining an optimization request at a coordinating engine. The acts also can include triggering engines to process the optimization request. At least one of the engines divides the optimization request into subproblems. At least a portion of the engines solve the subproblems. Respective instances of at least one of the engines are triggered to handle respective ones of the subproblems. Each of the engines provides a dynamic algorithmic flow using modularized algorithmic solvers. The dynamic algorithmic flow is adjusted based on a respective input to each of the engines. The acts additionally can include outputting, from the coordinating engine, one or more results in response to the optimization request, based on results for the subproblems generated by the engines.

A number of embodiments can include a method being implemented via execution of computing instructions configured to run at one or more processors. The method can include obtaining an optimization request at a coordinating engine. The method also can include triggering engines to process the optimization request. At least one of the engines divides the optimization request into subproblems. At least a portion of the engines solve the subproblems. Respective instances of at least one of the engines are triggered to handle respective ones of the subproblems. Each of the engines provides a dynamic algorithmic flow using modularized algorithmic solvers. The dynamic algorithmic flow is adjusted based on a respective input to each of the engines. The method additionally can include outputting, from the coordinating engine, one or more results in response to the optimization request, based on results for the subproblems generated by the engines.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although a modularized algorithmic scheme for multi-phase optimization has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIG. 10 may include different procedures, processes, and/or activities and be performed by many different modules, in many different orders. As another example, the systems and/or engines within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
a processor; and
a non-transitory computer-readable medium storing computing instructions that, when executed on the processor, cause the processor to perform operations comprising:
obtaining an optimization request at a coordinating engine;
triggering multiple different engines to process the optimization request, wherein at least one of the multiple different engines divides the optimization request into subproblems, wherein at least two or more of the multiple different engines solve the subproblems in parallel and using data sharing, between the multiple different engines, based on data, stored in a data persistence system, that includes at least one of inputs, constraints, data structures, or outputs, wherein respective instances of the multiple different engines are triggered to handle respective different ones of the subproblems, wherein each of the multiple different engines provides a dynamic algorithmic flow using modularized algorithmic solvers, wherein the dynamic algorithmic flow is adjusted based on a respective input to each of the multiple different engines and based on a saved status of at least one of the multiple different engines by copying steps of the dynamic algorithmic flow from a previous run, wherein the dynamic algorithmic flow comprises each of the respective instances of the multiple different engines (i) selecting and sequencing multiple different ones of the modularized algorithmic solvers within each of the respective instances of the multiple different engines based on characteristics of the respective input to each of the respective instances of the multiple different engines and (ii) collecting results from the different ones of the modularized algorithmic solvers to select a respective result for each of the subproblems, and wherein each of the multiple different ones of the modularized algorithmic solvers perform a different function; and outputting, from the coordinating engine, one or more overall results in response to the optimization request, based on the respective results for the subproblems generated by the multiple different engines, to cause a set of loads to be delivered on an inbound transportation network using respective carriers according to the one or more overall results output from the coordinating engine, wherein:

each of the multiple different engines uses a uniform IO data structure;

each of the multiple different engines is configured to import data from computer memory and to import data from external storage; and the dynamic algorithmic flow provides a plug-and-play framework for adding other modularized algorithmic solvers to the respective instances of the multiple different engines to extend capabilities of the multiple different engines and allow the multiple different engines to scale dynamically.

2. The system of claim 1, wherein the multiple different engines comprise:
a partition engine;
a routing engine;
a picking engine; and
a lane optimizer engine.

3. The system of claim 2, wherein:
the optimization request is for the inbound transportation network; and
the partition engine divides the inbound transportation network into subnetworks.

4. The system of claim 3, wherein:
multiple instances of the routing engine are triggered; and
each instance of the multiple instances of the routing engine is used for a different subnetwork of the subnetworks.

5. The system of claim 4, wherein the picking engine selects the set of loads from a combined pool of candidate loads generated by the multiple instances of the routing engine.

6. The system of claim 5, wherein the lane optimizer engine selects a carrier of the respective carriers for each load of the set of loads.

7. The system of claim 1, wherein:
the dynamic algorithmic flow is configurable to use recursion for one or more of the modularized algorithmic solvers.

8. A computer-implemented method comprising:
obtaining an optimization request at a coordinating engine;
triggering multiple different engines to process the optimization request, wherein at least one of the multiple different engines divides the optimization request into subproblems, wherein at least two or more of the multiple different engines solve the subproblems in parallel and using data sharing, between the multiple different engines, based on data, stored in a data persistence system, that includes at least one of inputs, constraints, data structures, or outputs, wherein respective instances of the multiple different engines are triggered to handle respective different ones of the subproblems, wherein each of the multiple different engines provides a dynamic algorithmic flow using modularized algorithmic solvers, wherein the dynamic algorithmic flow is adjusted based on a respective input to each of the multiple different engines and based on a saved status of at least one of the multiple different engines by copying steps of the dynamic algorithmic flow from a previous run, wherein the dynamic algorithmic flow comprises each of the respective instances of the multiple different engines (i) selecting and sequencing multiple different ones of the modularized algorithmic solvers within each of the respective instances of the multiple different engines based on characteristics of the respective input to each of the respective instances of the multiple different engines and (ii) collecting results from the different ones of the modularized algorithmic solvers to select a respective result for each of the subproblems, and wherein each of the multiple different ones of the modularized algorithmic solvers perform a different function; and outputting, from the coordinating engine, one or more overall results in response to the optimization request, based on the respective results for the subproblems generated by the multiple different engines, to cause a set of loads to be delivered on an inbound transportation network using respective carriers according to the one or more overall results output from the coordinating engine, wherein:
each of the multiple different engines uses a uniform IO data structure;

each of the multiple different engines is configured to import data from computer memory and to import data from external storage; and the dynamic algorithmic flow provides a plug-and-play framework for adding other modularized algorithmic solvers to the respective instances of the multiple different engines to extend capabilities of the multiple different engines and allow the multiple different engines to scale dynamically.

9. The computer-implemented method of claim 8, wherein:
the dynamic algorithmic flow is configurable to use recursion for one or more of the modularized algorithmic solvers.

10. The computer-implemented method of claim 8, wherein the multiple different engines comprise:
a partition engine;
a routing engine;
a picking engine; and
a lane optimizer engine.

11. The computer-implemented method of claim 10, wherein:
the optimization request is for the inbound transportation network; and
the partition engine divides the inbound transportation network into subnetworks.

12. The computer-implemented method of claim 11, wherein:
multiple instances of the routing engine are triggered; and
each instance of the multiple instances of the routing engine is used for a different subnetwork of the subnetworks.

13. The computer-implemented method of claim 12, wherein the picking engine selects the set of loads from a combined pool of candidate loads generated by the multiple instances of the routing engine.

14. The computer-implemented method of claim 13, wherein the lane optimizer engine selects a carrier of the respective carriers for each load of the set of loads.

15. A non-transitory computer-readable medium storing computing instructions that, when executed on a processor, cause the processor to perform operations comprising:

obtaining an optimization request at a coordinating engine;

triggering multiple different engines to process the optimization request, wherein at least one of the multiple different engines divides the optimization request into subproblems, wherein at least two or more of the multiple different engines solve the subproblems in parallel and using data sharing, between the multiple different engines, based on data, stored in a data persistence system, that includes at least one of inputs, constraints, data structures, or outputs, wherein respective instances of the multiple different engines are triggered to handle respective different ones of the subproblems, wherein each of the multiple different engines provides a dynamic algorithmic flow using modularized algorithmic solvers, wherein the dynamic algorithmic flow is adjusted based on a respective input to each of the multiple different engines and based on a saved status of at least one of the multiple different engines by copying steps of the dynamic algorithmic flow from a previous run, wherein the dynamic algorithmic flow comprises each of the respective instances of the multiple different engines (i) selecting and sequencing multiple different ones of the modularized algorithmic solvers within each of the respective instances of the multiple different engines based on characteristics of the respective input to each of the respective instances of the multiple different engines and (ii) collecting results from the different ones of the modularized algorithmic solvers to select a respective result for each of the subproblems, and wherein each of the multiple different ones of the modularized algorithmic solvers perform a different function; and outputting, from the coordinating engine, one or more overall results in response to the optimization request, based on the respective results for the subproblems generated by the multiple different engines, to cause a set of loads to be delivered on an inbound transportation network using respective carriers according to the one or more overall results output from the coordinating engine, wherein:

each of the multiple different engines uses a uniform IO data structure;

each of the multiple different engines is configured to import data from computer memory and to import data from external storage; and the dynamic algorithmic flow provides a plug-and-play framework for adding other modularized algorithmic solvers to the respective instances of the multiple different engines to extend capabilities of the multiple different engines and allow the multiple different engines to scale dynamically.

16. The non-transitory computer-readable medium of claim 15, wherein:

the dynamic algorithmic flow is configurable to use recursion for one or more of the modularized algorithmic solvers.

17. The non-transitory computer-readable medium of claim 15, wherein the multiple different engines comprise:

a partition engine;

a routing engine;

a picking engine; and a lane optimizer engine.

18. The non-transitory computer-readable medium of claim 17, wherein:

the optimization request is for the inbound transportation network; and the partition engine divides the inbound transportation network into subnetworks.

19. The non-transitory computer-readable medium of claim 18, wherein:

multiple instances of the routing engine are triggered; and each instance of the multiple instances of the routing engine is used for a different subnetwork of the subnetworks.

20. The non-transitory computer-readable medium of claim 19, wherein the picking engine selects the set of loads from a combined pool of candidate loads generated by the multiple instances of the routing engine.

* * * * *